(No Model.)
J. C. BRYAN.
INTERCHANGEABLE TIRE AND SLEEVE JOURNAL FOR CAR WHEELS.
No. 496,968. Patented May 9, 1893.
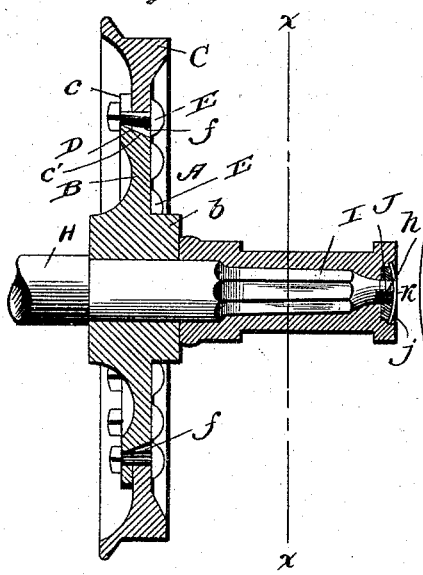
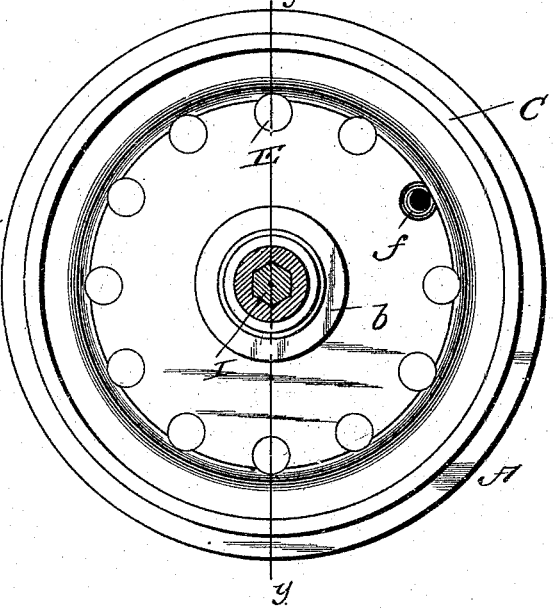
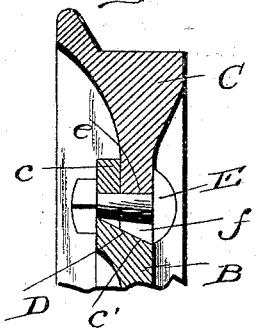
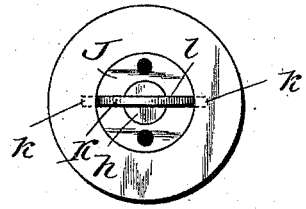
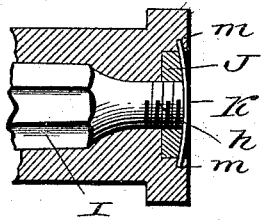
Witnesses:
Inventor:
John C. Bryan
By H. D. Money
Atty.

UNITED STATES PATENT OFFICE.

JOHN C. BRYAN, OF ATLANTA, GEORGIA, ASSIGNOR OF ONE-HALF TO F. W. MILLER, OF SAME PLACE.

INTERCHANGEABLE TIRE AND SLEEVE-JOURNAL FOR CAR-WHEELS.

SPECIFICATION forming part of Letters Patent No. 496,968, dated May 9, 1893.

Application filed July 22, 1892. Serial No. 440,872. (No model.)

*To all whom it may concern:*

Be it known that I, JOHN C. BRYAN, a citizen of the United States, and a resident of the city of Atlanta, State of Georgia, have invented certain new and useful Improvements in Interchangeable Tires and Sleeve-Journals for Car-Wheels; and I do hereby declare that the following is a full, clear, and exact specification of the same, such as will enable others skilled in the art to understand and construct the same.

The object of the present improvement is to enable a worn out wheel-tire or sleeve journal to be replaced at minimum expense and delay, the improvements affording a practical, durable and interchangeable tire and journal which are equally as applicable to old and worn out wheels and journals as to new ones.

The first part of the invention consists of a novel construction of the wheel in which the body and tire are made of separate pieces and united together by a beveled transverse seat which secures a very tight joint between the body and tire when they are drawn together by peculiarly shaped bolts that serve as a finish to the wheel, whereby unequal expansion of the wheel is prevented under the pressure or force of the brake-shoes when they are tightly applied to the wheel, rendering it impossible to burst the wheel, and also enabling the old or worn out tire to be quickly removed and replaced with a new one in a short time.

The second part of the invention relates to a sleeve journal adapted for either new or worn out axles and which is combined therewith in a novel way to reduce the liability of the axle to become unduly heated and thus obviate to a great extent the production of "hot boxes" when the car has been running rapidly or for a long time. The axle is tapered longitudinally toward its outer end, and made polygonal in cross section, and the interior of the sleeve journal is correspondingly formed to adapt the same to fit tightly on the axle; and said sleeve journal is held against endwise displacement on the axle by means of a nut which is screwed on the threaded reduced end of the axle and which fits in a cup or recess provided in the end of the sleeve journal, the outer face of said nut being recessed transversely to receive a spring or elastic key which has its ends sprung or forced into an annular seat or recess provided on the interior of the sleeve-journal.

The invention further consists in the novel construction and arrangement of parts which will be hereinafter fully described and particularly pointed out in the claims.

My invention is fully illustrated in the accompanying drawings, forming a part of this specification, in which—

Figure 1 is a vertical longitudinal sectional view through the axle and sleeve journal, with the wheel in transverse section, the plane of the section being indicated by the dotted line $y\ y$, of Fig. 2. Fig. 2 is a view of the wheel in side elevation with the axle and sleeve journal in cross section, the plane of section being indicated by the dotted line $x\ x$ of Fig. 1. Fig. 3 is an enlarged detail view of a portion of the car wheel. Fig. 4 is an end view, on an enlarged scale, of the axle and journal sleeve, showing the means for fastening the nut in place. Fig. 5 is a longitudinal sectional view through the parts shown by Fig. 4, and Fig. 6 is an enlarged cross sectional view through the bolt E for uniting the flanged tire and the body of the car wheel.

Like letters of reference denote corresponding parts in all the figures of the drawings.

A designates the wheel which consists of a body B and a removable tire C which is seated upon and bolted to the periphery of the body. This central body has a hub $b$ which is secured in any suitable or desirable way to the axle; and the periphery of the annular body is provided with a radial flange $c$ which lies on the inner side of the body and is flush with the inner face of the wheel. The periphery of the body B, on the outside of the radial flange, is beveled or inclined transversely to form the seat D, and the inner edge of the tire C is correspondingly beveled or inclined at $c'$ to adapt the same to be fitted tightly on the seat of the body.

The inner face of the web of the tire bears against the radial flange on the wheel-body, and the tire and body are drawn tightly together by means of the bolts E which act or serve as wedges while in the act of joining the parts. The web or body of the wheel is provided with a series of transverse conical-shaped recesses or holes $f$ in its periphery and these conical holes are extended through the radial flange $c$ on the web or body B in the form of bolt holes $g$. The bolts E are made conical shaped to conform to the shape of the recesses $f$ in the web or body B, and said bolts are each flattened on one side, as at $e$, to adapt the same to bear snugly against the inner edge of the web of the tire C. The heads of the bolts are enlarged to adapt them to bear against the web or body of the wheel and the inner edge of the tire which is made continuous, and these heads thus have a firm bearing against the wheel and tire and serve as a finish to the wheel. By making the bolts tapering in the direction of their length, and fitting them in the conical shaped recesses, the bolts are adapted to act as wedges in drawing and holding the tire C on the body or web of the car wheel; and the tire and body are firmly and securely united together without perforating the tire or the web and thus the strength of said parts is preserved and the wheel rendered more durable. The wheel is thus constructed in two parts which tends to relieve the same of undue expansion due to the friction of the brake-shoe on the periphery thereof when the brake is forciby applied, making it impossible to burst the wheel.

The tire can be readily removed when injured or worn out simply by removing the nuts and bolts, and a new tire can be quickly and easily substituted therefor.

The axle H has its journal reduced in order to give sufficient body to the sleeve journal I which is used in connection with the axle. This journal of the axle is tapered longitudinally from its inner end toward its outer end, and said journal is made hexagonal in cross section, or of any other desired polygonal form. The outer extremity of the axle journal is provided with a reduced end $h$ which is made cylindrical and provided with external screw threads adapted to receive the nut J which serves to hold the removable sleeve journal I in position. The inner bore of this sleeve journal is tapered reversely to the taper of the axle journal, and its inner walls are made angular (hexagonal or of other desired polygonal form) to correspond to the polygonal cross sectional form of the axle journal. The sleeve journal is slipped endwise on the axle journal, and fits tightly thereon, and the inner end of this sleeve journal bears or impinges firmly against the hub of the wheel A and tends to strengthen and reinforce the same.

The outer end of the sleeve journal is recessed or made cup shaped as at $j$ to adapt the nut J to fit snugly in the end of said sleeve journal, and this nut is held rigidly in place by means of an elastic or spring key K which is formed of a single piece of metal, bowed or curved longitudinally, and forked at its ends to provide the prongs $k$ which enable the key to take a firm grip on the recesses or seats provided in the walls of the sleeve journal therefor. The outer face of the nut is provided with a transverse recess $l$ and in the interior surface or wall of the sleeve journal is provided an annular seat or recess $m$, and the nut is screwed on the threaded extremity of the axle journal so that its transverse recess $l$ coincides with the annular recess $m$ on the sleeve journal. After the key has been properly curved or bowed to enter the end of the sleeve-journal, it is fitted in the sleeve and in the recess $l$ in the face of the nut, after which the ends of the key are forced into the annular seat $m$ $m$ in the sleeve by a blow from a hammer or other suitable implement which is struck on the middle curved part of the key and which tends to straighten the key out or flatten the same, so that it is distended to force the prongs $k$ thereof into the annular recess or seat $m$ in the sleeve journal. The nut is thus locked in place on the axle journal to prevent the same from working loose, and the sleeve journal is confined against endwise displacement and the parts are firmly secured together.

I do not desire to limit myself to the exact details of construction and form and proportion of parts herein shown and described as an embodiment of my invention, and I therefore reserve the right to make such modifications and alterations as fairly fall within the scope of the invention.

Having thus fully described my invention, what I claim as new, and desire to secure by Letters Patent, is—

1. A car wheel having its body or web provided with the peripheral inclined seat and the tapered transverse recesses, a tire fitted on said peripheral seat, and the tapered bolts passing through said recesses and having the heads bearing against the tire and the body or web, as and for the purpose described.

2. A car wheel provided with the flange and the tapered recesses in a transverse seat on the periphery of its body or web, the tire fitted snugly on the seat and against the flange, and the tapered bolts fitted in said recesses to bear against the tire and having their heads enlarged to bear against the faces of the tire and the web or body, as and for the purpose set forth.

3. The combination of the polygonal axle-journal, the journal sleeve fitted snugly thereon, and a nut secured on the axle and bearing against the sleeve-journal, as and for the purpose described.

4. The combination of a tapered axle-journal polygonal in cross section, a tubular sleeve-journal having its polygonal tapered bore fitted snugly on the axle-journal, and the nut secured on the extremity of said axle-journal, substantially as described.

5. The combination with an axle journal having a threaded extremity, of the sleeve-journal fitted thereon and provided with the internal key-seat, a nut screwed on the axle-journal, and an elastic key connected to the nut and having its ends sprung into the seat in the sleeve-journal, as and for the purpose described.

6. The combination of an axle journal, the sleeve-journal provided with the internal key-seat, the nut fitted on the end of the axle-journal and having the transverse recess in its outer face, and the bowed elastic key fitted in the recess of the nut and having its forked ends seated in the seat of the sleeve-journal, as and for the purpose described.

In testimony that I claim the foregoing as my invention I hereunto affix my signature, in the presence of two witnesses, this the 12th day of July, 1892.

JOHN C. BRYAN.

Witnesses:
JOHN M. COOPER,
D. A. LOYLESS.